United States Patent Office 2,963,527
Patented Dec. 6, 1960

2,963,527

ISOMERIZATION OF NORMAL PARAFFINS

Paul H. Johnson and King L. Mills, Jr., Bartlesville, Okla., assignors to Phillips Petroleum Company, a corporation of Delaware No Drawing. Filed Sept. 13, 1957, Ser. No. 683,696

9 Claims. (Cl. 260—683.68)

This invention relates to isomerization. In one of its aspects it relates to the isomerization of hydrocarbons employing a catalyst essentially comprising a fluorinated alumina which has been impregnated with a soluble cobalt salt and a soluble molybdenum salt, dried, heated to dehydration and presulfided. In another of its aspects, the invention relates to a novel catalyst as just described. In a more specific aspect the invention relates to the isomerization of hydrocarbons having from 4 to 6 carbon atoms with a presulfided cobalt molybdate-fluoride treated alumina catalyst in the presence of hydrogen under conditions hereinafter set forth. More specifically still, the invention relates to the isomerization of a hydrocarbon such as butane, pentane, a hexane and mixtures thereof, fractions of straight-run gasoline, natural gasoline fractions, etc. In a further aspect still, the invention relates to the preparation of a catalyst suitable for isomerization of hydrocarbons as described, wherein the catalyst which is presulfided is activated or regenerated with air and then with heat and hydrogen prior to use.

The isomerization of hydrocarbons, and other compounds, possesses great industrial interest. For example, the isomerization of hydrocarbons in the oil refinery is currently carried out on a tremendous scale. Specifically, normal butane is isomerized to isobutane which then is alkylated with an olefin to produce isoparaffins having high anti-knock value. Also, the isomerization of normal pentane to isopentane produces additional source of high octane gasolines. In other preparations still, the isomerization of organic compounds is of current wide interest.

We have now found that an excellent isomerization catalyst is produced if an alumina base such as gamma alumina is treated with a fluoride such as hydrogen fluoride following which this base is impregnated with cobalt-molybdate using, for example, cobalt nitrate and ammonium molybdate. The catalyst is then dried and dehydrated following which it is presulfided. This catalyst, as later described, yielded excellent results in the isomerization of hydrocarbons especially when activated or "regenerated" as herein described prior to use.

An object of this invention is to provide a novel isomerization catalyst suitable for the isomerization of hydrocarbons. Another aspect of this invention is to provide a novel isomerization process suitable for the isomerization of hydrocarbons. A further object of this invention still, is to provide for the isomerization of hydrocarbons having from 4 to 6 carbon atoms in the molecule and possessing substantially a paraffin structure.

Other aspects, objects, and several advantages of the invention are apparent from this disclosure and the appended claims.

According to this invention there is provided a fluorinated alumina base cobalt-molybdate impregnated and presulfided catalyst suitable for the isomerization of organic compounds, especially hydrocarbons of a paraffin character. Also, according to this invention there is provided an isomerization process suitable for the isomerization of compounds, particularly hydrocarbons such as butane, pentane, hexanes and mixtures thereof, lower boiling fractions of straight-run gasoline, natural gasoline fraction, compounds partaking of a character of such hydrocarbons, etc. The process of this invention is generally applicable to isomerize lower boiling paraffin hydrocarbons as set forth. While various mixtures of these hydrocarbons can be isomerized, somewhat better results are ordinarily obtained if the material treated is but a fraction of relatively narrow boiling range and preferably is essentially but a single hydrocarbon or compound.

The isomerization catalyst of this invention in one instance is prepared as follows: gamma alumina is treated with a fluoride such as HF to give a fluoride concentration of 0.01 to 10 weight percent in the catalyst. This base is impregnated with cobalt-molybdate using, in this example, cobalt nitrate and ammonium molybdate. The concentration of the cobalt-molybdate in the catalyst is from 2 to 10 weight percent. The ratio of CoO to $MoO_3$ is in the range of 0.1 to 2. The catalyst is dried at about 250° F. and finally dried by placing it in a furnace at 900° F., removing water vapor with a stream of nitrogen. Other inert gases can be used, if desired. The catalyst thus obtained, is presulfided by passing a stream of hydrogen sulfide through the catalyst mass for a period of from 5 minutes to 1 hour or longer. It can also be treated at isomerization temperatures with say, a mercaptan dissolved in n-pentane or other low boiling hydrocarbons. The catalyst after it is presulfided is given an activation or "regeneration" treatment with air and nitrogen, or other suitable inert gas, at a temperature which is in the neighborhood of 900–1050° F.

The isomerization is carried out with conventional apparatus and in a conventional manner. One suitable method comprises preheating and vaporizing the hydrocarbon feed and passing the hydrocarbon vapors in admixture with a later specified ratio of hydrogen through a bed of the catalyst maintained at later specified conditions of temperature and pressure. After cooling to liquefy the hydrocarbon products, the gas rich in hydrogen can be recycled, if desired.

Although the isomerization can be carried out at temperatures ordinarily employed in the art, temperatures ranging from about 550 up to about 900° F., preferably in the range of 675 to 800° F., are now considered most advantageous. High pressures are not necessary, atmospheric pressure can be employed and excellent conversions are obtained using moderate pressures such as in the range of 100 to 1,000 p.s.i., and preferably about 600 p.s.i., to facilitate operation of the recovery system. Hydrogen partial pressure is maintained sufficiently high to prevent or minimize coke lay-down on the catalyst, as will be understood by one skilled in the art. The liquid hourly space velocity can range from 0.5 to 10 or even higher and now is preferably 2 to 6. The mole ratio of hydrogen to hydrocarbon is in the range of 0.5 to 4 preferably 1 to 2.

After use, the catalyst can be regenerated with a dry oxidizing gas such as dry air and reduced in hydrogen.

EXAMPLE I

Normal pentane was isomerized over a cobalt-molybdate on a halogen treated alumina catalyst. The efficiency of isomerization was very low. About 0.14 weight percent ethyl mercaptan was added to the feed and the efficiency of isomerization was somewhat increased.

EXAMPLE II

A cobalt-molybdate on HF treated alumina was used to isomerize normal pentane. The efficiency of isomerization was very low. The catalyst was regenerated at a high temperature (circa 900° F.) with dry air and nitrogen, and then reduced with hydrogen. It was then treated with normal pentane containing 0.14 weight percent ethyl mercaptan to presulfide its surface, and then again activated or regenerated as before with dry air and nitrogen. Another run with pentane was made and the efficiency of isomerization was high.

EXAMPLE III

A catalyst base consisting of gamma alumina containing 5.4 weight percent fluorine was impregnated with 10 percent CoO—MoO$_3$, using Co(NO$_3$)$_2$.6H$_2$O and (NH$_4$)$_6$Mo$_7$O$_{24}$.H$_2$O dissolved in just enough water to wet the base completely. The catalyst was immediately dried under a heat lamp at about 250° F. and then further dried rapidly by placing into a fixed-bed catalyst tube and passing a stream of purge nitrogen therethrough at a temperature maintained at about 900° F.

The catalyst was contacted with a high-sulfur stock, to presulfide it, and activated or regenerated, as described herein, at 900–1050° F. prior to the isomerization test. The stock was a 400° F. topped Wafra crude containing 3.6 percent sulfur. The isomerization test was made using the following conditions:

Liquid hourly space rate_____ 1
Hydrogen-hydrocarbon mole ratio_____ 1
Pressure, p.s.i.g._____ 600
Reactor temperature, ° F_____ 750

The charge was pure normal pentane.

| Yields, Percent Charge to Reactor | Wt. Percent | Vol. Percent |
| --- | --- | --- |
| Methane | 0.08 | |
| Ethane | 1.32 | |
| Propane | 1.81 | 2.25 |
| Isobutane | 0.76 | 0.85 |
| n-Butane | 1.81 | 1.95 |
| Isopentane | 54.94 | 55.50 |
| n-Pentane | 39.28 | 39.28 |
| Efficiency | | 91.6 |

EXAMPLE IV

An attempt was made to isomerize n-pentane over a commercial hydrodesulfurization catalyst. The catalyst composition was 2.5 weight percent CoO, 9.3 weight percent MoO$_3$, and 88.2 weight percent Al$_2$O$_3$. Operating conditions were 660 p.s.i.g., 790° F., 0.8 LHSV, and 2 moles of hydrogen per mole of pentane. Composition of the liquid product in weight pecrent was:

C$_2$ _____ 0.09
C$_3$ _____ 0.93
i-C$_4$ _____ 0.03
n-C$_4$ _____ 2.94
i-C$_5$ _____ 2.50
n-C$_5$ _____ 93.51

From the above data, it is apparent that the cobalt colybdate-alumina catalyst has little isomerization activity, only 2.5 percent isopentane being in the effluent.

EXAMPLE V

The following data show the effect of fluorine content on the activity of the fluorinated catalyst. The feed was substantially pure pentane.

| Catalyst | R–I | R–II | R–III |
| --- | --- | --- | --- |
| CoO.MoO$_3$ | 9.1 | 9.4 | 9.1 |
| F | 1.0 | 2.7 | 4.5 |
| Al$_2$O$_3$ | 89.9 | 87.9 | 86.4 |
| Process: | | | |
| Temperature, F | 780 | 758 | 748 |
| Pressure, p.s.i.g | 600 | 600 | 600 |
| LHSV | 1.1 | 1.0 | 1.1 |
| H$_2$/HC, mole | 1.3 | 1.2 | 0.9 |
| i-C$_5$ per pass, LV percent | 20.6 | 54.3 | 56.7 |
| Efficiency, LV percent | 87.7 | 91.3 | 89.3 |

In the above runs, each catalyst was presulfided and regenerated, as herein described. This example shows that as the fluorine content increased from 1.0 to 4.5 percent by weight of the catalyst, the isopentane produced per pass increased from 20.6 to 56.7. Thus, at about 750° F., Catalyst R–III with 4.5 percent fluorine gave 56.7 percent per pass of isopentane. A catalyst having about 9 percent CoO.MoO$_3$, about 2.5–5 percent fluorine and the remainder Al$_2$O$_3$ is considered a good example of this invention. Another good example is a catalyst having about 5 percent CoO.MoO$_3$, about 5 percent fluorine and the remainder alumina.

From these examples it is evident that the catalyst of this invention essentially is one comprising a fluorinated alumina base impregnated with a soluble cobalt and a soluble molybdenum salt, dried, heated to dehydration, and presulfided. Also, according to the invention, considerably better results have been found to be obtainable provided the catalyst is activated or regenerated, as herein described, prior to use.

EXAMPLE VI

The data shown in the table below aid in a further understanding of the invention. The same catalyst was used in all runs, the only difference being in the treatment. The catalyst composition was (in percent by weight): 1.8 CoO, 3.4 MoO$_3$, 90.0 Al$_2$O$_3$, and 4.8 F. In Run I, which is a run according to the invention, the catalyst was presulfided with 0.3 weight percent ethyl mercaptan in n-pentane, and was then given an activation regeneration treatment with air plus nitrogen at 900–1050° F. In Run II, the catalyst was used without presulfiding. The feed contained 0.3 percent ethyl mercaptan. The catalyst from Run II was then regenerated and used to obtain the data of Run III. Run II thus corresponds to operations in which there is effected no presulfiding. Both conversion and ultimate yield were low without presulfiding. Both conversion and ultimate yield were considerably higher in Run III than in Run II showing that the low values for Run II are not due to insufficient run time to build up the sulfur content of the catalyst. Regenerating apparently insures that there is a proper amount of sulfur present. Also as noted, regeneration has an activating effect on the final catalyst. The invention provides a method for preparing an active isomerization catalyst, yielding excellent results. In the following table the feed in each run was normal pentane.

*Table I*

| Run | I | II | III |
| --- | --- | --- | --- |
| Operating Conditions: | | | |
| Temperature, F | 714 | 750 | 705 |
| LHSR | 1.1 | 1.2 | 0.8 |
| H$_2$/nC$_5$, mole ratio | 1.2 | 1.1 | 1.7 |
| Pressure, p.s.i.g | 600 | 600 | 600 |
| Hours on stream | 1.5 | 1.5 | 1.5 |
| Feed | n-C$_5$ | n-C$_5$ | n-C$_5$ |
| Yields, Wt. percent feed: | | | |
| CH$_4$ | 0.4 | 0.5 | 0.9 |
| C$_2$'s | 0.6 | 1.3 | 1.4 |
| C$_3$'s | 0.9 | 1.9 | 1.8 |
| iC$_4$ | 0.2 | 0.9 | 0.4 |
| nC$_4$ | 1.2 | 1.3 | 2.4 |
| iC$_5$ | 53.4 | 23.1 | 42.5 |
| nC$_5$ | 43.3 | 71.0 | 50.6 |
| CyC$_5$+ | | | |
| nC$_5$ conversion | 56.7 | 29.0 | 49.4 |
| iC$_5$ ultimate yield | 94.2 | 79.7 | 86.0 |

It will be obvious to those skilled in the art in possession of this disclosure and having studied the same, that the ultimate catalyst composition can be produced with variations in the preparation set forth herein. This can be done without departing from the essential concepts of the invention.

Reasonable variation and modification are possible within the scope of the foregoing disclosure and the appended claims to the invention the essence of which is that there has been provided a fluorinated, alumina-based, cobalt-molybdate presulfided catalyst suitable for isomerization of isomerizable compounds, specifically hydrocarbons such as the normal paraffin hydrocarbons, having 4 to 6 carbon atoms to the molecule in a preferred form of the invention, and that an isomerization process employing such a catalyst has been set forth.

We claim:

1. The isomerization of an isomerizable hydrocarbon in the gasoline boiling range which comprises subjecting said compound under isomerizing conditions to the action of an isomerization catalyst prepared by treating an alumina base with a fluoride, impregnating said thus treated base with cobalt-molybdate, drying, and dehydrating the catalyst thus obtained, sulfiding the same by contacting it with a sulfur-containing organic compound adapted to sulfide the surface of the catalyst and then regenerating said catalyst in a mixture of air and nitrogen at a temperature in the range 900–1,050° F. prior to use.

2. A method for the isomerization of an isomerizable low boiling paraffin hydrocarbon in the gasoline boiling range which comprises contacting the same under isomerization conditions with an isomerization catalyst assentially comprising a fluorided alumina impregnated with cobalt-molybdate, which has been presulfided and which has been activated at a temperature in the approximate range 900–1,050° F. prior to use.

3. The isomerization of normal paraffin hydrocarbons having from 4 to 6 carbon atoms in the molecule which comprises contacting the same with a presulfided cobalt-molybdate fluoride-treated alumina catalyst which has been activated at a temperature in the approximate range 900–1,050° F. in the presence of air and nitrogen in the presence of hydrogen under isomerization conditions.

4. The isomerization of hydrocarbons according to claim 3 wherein the hydrocarbon is selected from butane, pentane, hexanes and mixtures thereof, low boiling fractions of straight run gasoline, and natural gasoline fractions.

5. The isomerization of a paraffin hydrocarbon having from 4 to 6 carbon atoms in the molecule with a presulfided cobalt-molybdate fluoride-treated alumina catalyst, which has been activated at a temperature in the range 900–1,050° F. in the presence of air and nitrogen in the presence of hydrogen under conditions as follows: a temperature in the range of from about 550 to 900° F., a pressure of from substantially atmospheric to 1,000 pounds per square inch, a liquid hourly space velocity of from 0.5 to about 10, and mole ratio of hydrogen to hydrocarbon in the range of from 0.5 to 4.

6. The isomerization of normal pentane which comprises subjecting the same at a temperature of approximately 750° F. and a pressure of approximately 600 pounds per square inch gauge to an isomerization catalyst having the following approximate composition: CoO.MoO—9 percent, F—2.5–5 percent, and the remainder alumina, said catalyst before said subjecting is effected having been presulfided and activated at an elevated temperature in the presence of air and nitrogen.

7. The isomerization of a normal paraffin hydrocarbon having 4 to 6 carbon atoms to the molecule by contacting the same under isomerization conditions in the presence of hydrogen with a catalyst having the following composition: cobalt-molybdate about 5 percent, fluoride about 5 percent, and the remainder alumina, said catalyst before said contacting is effected having been presulfided and activated at an elevated temperature in the presence of air and nitrogen.

8. The isomerization of a low boiling paraffin hydrocarbon which comprises contacting the same under isomerization conditions with a cobalt-molybdate catalyst containing fluoride which before said contacting is effected has been presulfided and then has been activated under activating conditions including an elevated temperature in the presence of a gas inert to said catalyst before said catalyst has been used in the presence of hydrocarbon.

9. A method of conditioning a catalyst and then using it for isomerization, the catalyst essentially comprising a fluorinated alumina base impregnated with cobalt-molybdate and having a sulfided surface for isomerization of hydrocarbons which comprises treating said catalyst in a substantially inert gas at a temperature in the neighborhood of 900–1,050° F. and then using said catalyst for isomerization of a paraffin hydrocarbon in the gasoline boiling range.

References Cited in the file of this patent
UNITED STATES PATENTS

| | | |
|---|---|---|
| 2,739,132 | Riedl | Mar. 20, 1956 |
| 2,753,310 | Riedl | July 3, 1956 |
| 2,762,854 | McKinley et al. | Sept. 11, 1956 |
| 2,817,637 | Porter et al. | Dec. 24, 1957 |